(No Model.)
W. E. BROWN & H. J. DURGIN.
MACHINE FOR PAINTING WIRE FENCES.
No. 276,347. Patented Apr. 24, 1883.
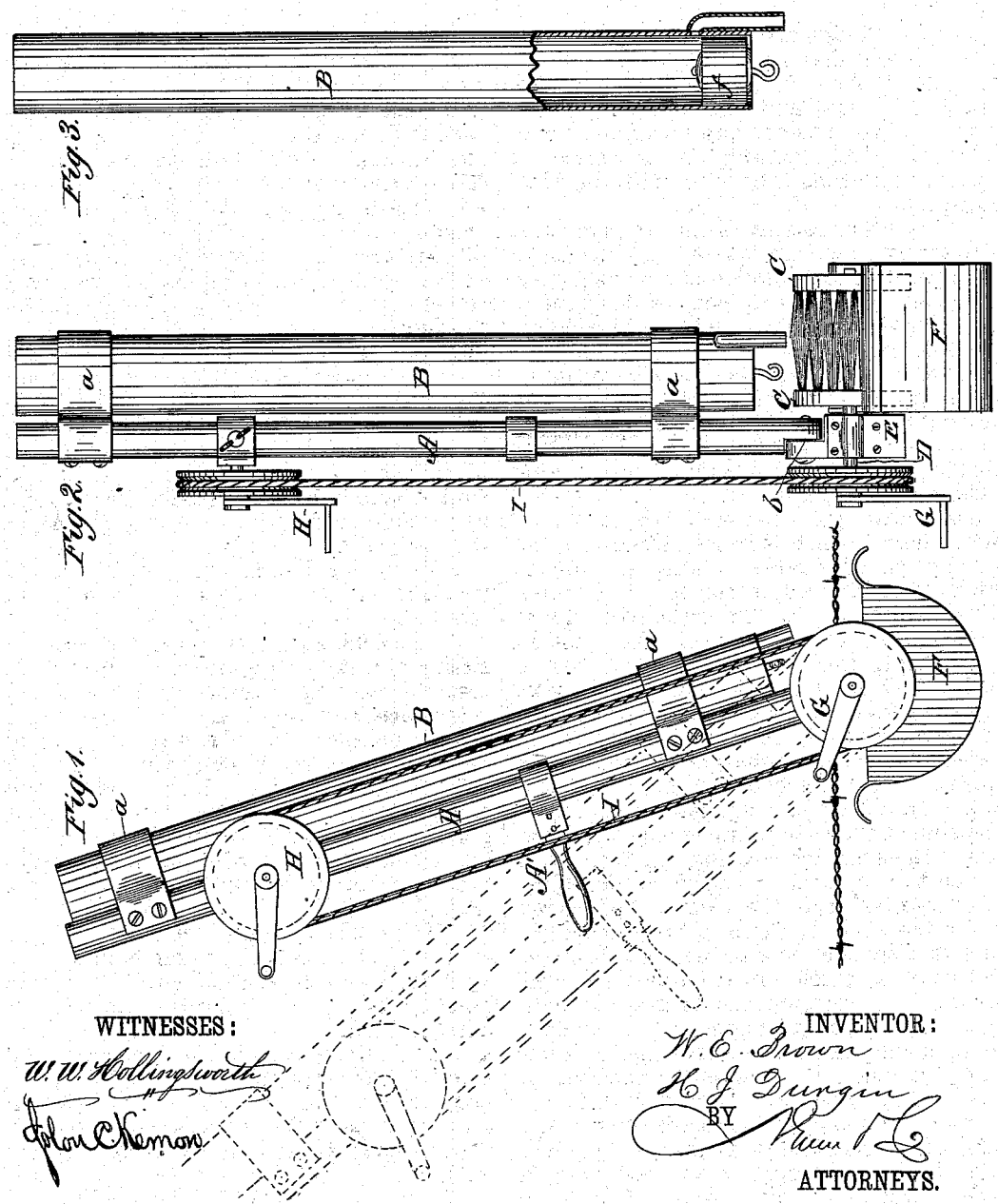
WITNESSES:
W. W. Hollingsworth
John C. Kenon
INVENTOR:
W. E. Brown
H. J. Durgin
BY
ATTORNEYS.

UNITED STATES PATENT OFFICE.

WILLIAM E. BROWN AND HENRY J. DURGIN, OF IRVING, KANSAS.

MACHINE FOR PAINTING WIRE FENCES.

SPECIFICATION forming part of Letters Patent No. 276,347, dated April 24, 1883.

Application filed September 25, 1882. (No model.)

*To all whom it may concern:*

Be it known that we, WILLIAM E. BROWN and HENRY J. DURGIN, of Irving, in the county of Marshall and State of Kansas, have invented certain new and useful Improvements in Machines for Painting Wire Fences, of which the following is an exact, full, and clear description.

Our invention relates to an improved machine for painting wire fences; and it consists in the peculiar construction and arrangement of a revolving brush drip-pan, jointed handle, and tubular reservoir, as will be hereinafter more fully described.

Figure 1 is a side view of the machine, shown applied to a barbed fence-wire. Fig. 2 is a view of the same at right angles to that shown in Fig. 1, and Fig. 3 is a view of the tubular paint-reservoir with the lower portion of the same in section.

In the drawings, A represents the main supporting-frame, which is in the nature of a rod carrying an adjustable handle, A', and to which rod is fastened, by straps a a, the tubular paint-reservoir B. This reservoir has at its lower end an outlet-nozzle, and immediately beneath the same are arranged the two brushes C C, consisting of disks with bristles projecting from the sides thereof toward each other. As shown, both these brushes are arranged upon the same shaft D and are rotated together in the same direction. We may, however, if desired, arrange said brushes upon independent shafts to rotate in opposite directions. The shaft for rotating said brushes is journaled in a block, E, which is jointed by means of a bolt, b, to the lower end of the rod A. To the shaft D there is hung a pan, F, which is suspended just beneath the brushes, and serves to catch the drippings from the brushes. For rotating the brushes a crank-handle, G, is arranged upon the shaft, and to avoid stooping down when painting the lower wires of a fence a second crank and pulley, H, is arranged upon the rod A, nearer the upper end of the same, and imparts motion to the shaft and brushes below through band I and pulley J. The said upper crank and pulley is made adjustable on rod A to permit it to be adapted to the proper position on said shaft. The object of the joint between the handle A and the journal-block below is to permit the handle and reservoir-tube to assume different inclinations in painting the different wires of a fence, which wires are different distances from the ground.

In making use of the device as thus described the handle A' is taken in the left hand, and the upper end of the rod is rested against the left shoulder, while the machine is preferably suspended from the right shoulder by means of a strap. The brushes are then applied to the wire of the fence, as shown, and as the operator walks along the brushes are rotated by one of the two crank-handles, so as to completely coat the wire with the paint which flows from the nozzle of the tubular reservoir. This nozzle, it will be seen, opens into the reservoir upon the side and at a point a little above the bottom of the same, and in the lower end of said reservoir is an adjustable plug or stopper, *f*, which may be pulled down, as shown, to permit the paint to flow out of the reservoir, or which plug may be forced up over the said outlet to close it.

Having thus described our invention, what we claim as new, and wish to secure by Letters Patent, is—

1. A machine for painting wire fences, consisting of a supporting-frame, a tubular paint-reservoir having a nozzle at its lower end, a rotary brush arranged on an axis at right angles to the reservoir, and a drip-pan suspended beneath the brush, substantially as described.

2. The combination, with the rotary brush and its shaft and bearing-block, of the supporting-rod A and reservoir B, the said rod being jointed, as described, to the bearing of the rotary brush, as and for the purpose described.

3. The brush composed of two disks, C C, having bristles on the side projecting toward each other, in combination with the drip-pan, paint-reservoir, and supporting-pan, as shown and described.

4. The combination of the frame A A', reservoir B, the rotary brush C C, and drip-pan, and the two crank-handles and pulleys, with connecting-band for rotating the brushes for high or low wires without stooping, as set forth.

WM. E. BROWN.
HENRY J. DURGIN.

Witnesses:
J. ARMSTRONG,
M. D. KEENEY.